Nov. 8, 1960

S. EDEMA 2,959,419

RECORD PLAYER

Filed June 17, 1955

INVENTOR

SJOERD EDEMA

BY Fred M Vogel

AGENT

United States Patent Office 2,959,419

Patented Nov. 8, 1960

2,959,419

RECORD PLAYER

Sjoerd Edema, Eindhoven, Netherlands, assignor, by mesne assignments, to North American Philips Company, Inc., New York, N.Y., a corporation of Delaware Filed June 17, 1955, Ser. No. 516,283

Claims priority, application Netherlands June 18, 1954

4 Claims. (Cl. 274—15)

Figure 1:
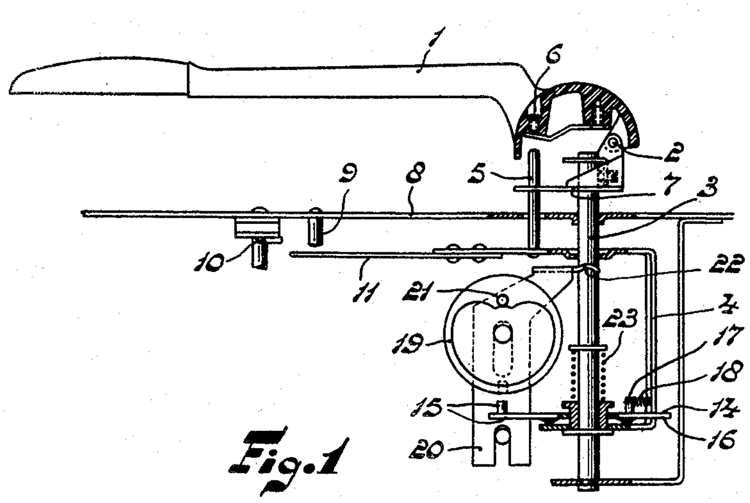

The invention relates to record players, and more particularly to a device for scanning records in which a tone arm is guided by a control member during the interval between the playing of successive records. After a record has been played, the tone arm is successively lifted and moved beyond the outer rim of the record, and after another record has been arranged in the playing position, the tone arm is moved inwardly, i.e. toward the center of the record and lowered on the record to a position just inside its rim. The positioning of the tone arm adjacent the rim of any record regardless of its diameter is controlled by a mechanism rigidly connected to the tone arm and which may be stopped in a predetermined position depending upon the diameter of the record to be played.

According to the invention a mechanism is provided for controlling the movement of the tone arm of a record player during the interval between the playing of successive records by means of a resiliently mounted connection which is engageable with the tone arm for effecting the movement of the latter in opposite directions from and toward the center of the record. The movement of the resiliently mounted connection is effected by a rotatable control member and a follower which is actuated upon engagement with the control member during the interval between the playing of successive records.

In order that the tone arm can always be moved outwardly to an accurately determined point outside the periphery of the records and can also be moved inwardly to an accurately determined point over the records it is desirable that the follower should occupy the same position with respect to the tone arm at the beginning of the inward and outward movements of the arm even though the position of the follower with respect to the arm must be at variance with one another during the playing of the record. According to the invention this problem is solved by a mechanism which includes a slip clutch between the follower and the tone arm so that during the inward movement of the tone arm the member, which is rigidly connected to the tone arm in the outward direction can be held flexibly during the playing of the record. In addition, a resilient connection is provided in parallel with the slip clutch to urge the follower toward its initial position with respect to the tone arm. Thus, in a device comprising only a single follower, the combination of the slip clutch and the resilient connection ensures that not only the outward movement but also the inward movement occur at an accurately determined position of the follower with respect to the tone arm. Generally, the outward movement of the tone arm can be effected unimpeded and swung to the same predetermined maximum outwardly position each time the records are changed. The inward movement of the tone arm invariably starts from the aforesaid maximum outwardly position but is fixed with respect to its unimpeded inwardly swing. The slip clutch provides a means whereby this inward movement may vary from a maximum inward movement.

According to a further feature of the invention the resistance of the resilient connection between the follower and tone arm is less than the friction of the slip clutch. The foregoing feature consequently provides the advantage that the slip clutch can rigidly engage the follower with respect to the tone arm in spite of the resilient connection. In addition, the slip clutch can be disconnected at an instant when inertia forces transmitted by the follower will not adversely affect the position at which the tone arm can be lowered on the record. Generally, the slip clutch will only be disconnected after the needle has been located in the grooves of the record to be played.

In a favourable embodiment of the device in accordance with the invention the slip clutch and the resilient connection are both provided between the follower and the member which is rigidly connected to the tone arm during the interval between the playing of successive records. The aforesaid member is used as a part of the slip clutch and the tone arm is raised or lowered during the engagement or disengagement of the clutch. The movement of the tone arm is effected by a lever which is actuated by a control member. A follower which translates its own motion to the tone arm during the interval between the playing of records is also connected to the control member during this interval. Consequently the movement for raising and lowering the tone arm, which movement is at least partially transmitted to the follower, can cause the follower and the control member to be connected and disconnected. The follower can adjust itself relatively to the member which is rigidly connected to the tone arm during the playing of a record under the action of the resilient connection without being impeded by the control member, when the slip clutch is disconnected.

Figure 2:
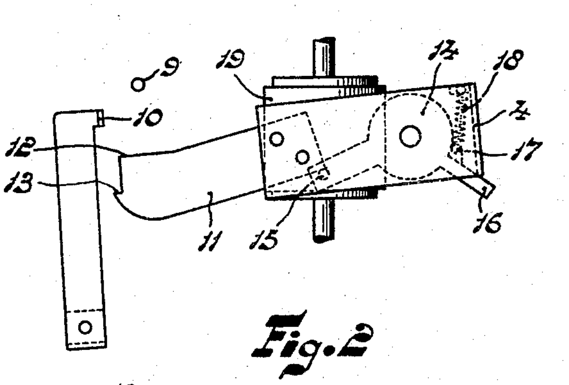
Figure 3:
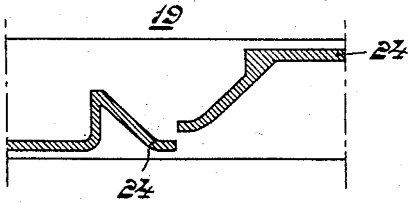

The invention will now be described more fully with reference to the accompanying diagrammatic drawing, in which an embodiment thereof is given by way of example, and in which Fig. 1 is a side view of a record player in accordance with the invention, Fig. 2 is a plan view of several parts shown in Fig. 1, and Fig. 3 is a developed view of a part shown in Figs. 1 and 2.

In the drawing tone arm 1 is pivoted in a vertical direction about shaft 2. Shaft 2 is secured to a vertical shaft 3 so that the tone arm can be rotated around and together with shaft 3 in a horizontal plane. A U-shaped brace 4 is slidably mounted in a vertical direction on shaft 3. The brace 4 slides on shaft 3 and carries with it an elevating pin 5 which is arranged on one of the arms of brace 4 and acts to raise and lower tone arm 1. For this purpose pin 5 co-operates with an adjusting screw 6 provided in the tone arm, the raising movement of the pin 5 being guided by a second U-shaped brace 7 which is rigidly connected to shaft 3. In rotational direction the brace 4 is connected with the shaft 3 by means of pin 5 and brace 7. A stud 9 on a mounting plate 8 is provided to restrain the inward motion of brace 4, and therefore the tone arm, when the tone arm is raised. The stud is located at a position corresponding to a position from which this arm is required to be lowered on a 7 inch record. An adjustable stop 10 prevents the inward movement of brace 4 for records of 10 and 12 inches respectively. For this purpose brace 4 is provided with an extension 11 having stops 12 and 13 on one end thereof. Plate 14 provided with friction material is located between the arms of U-shaped member 4. A follower 15 is secured to plate 14. In addition, plate 14 includes a projection 16 and a projection 17 which is connected to the U-shaped brace 4 by means of a weak spring 18. Spring 18 tends to keep the projection 16 urged against the vertical part of the brace 4. A control member 19 shaped in the form of a horizontal cylinder includes guiding cams 24, which co-operate with follower 15. Control member 19 also actuates a lifting device 20. For this purpose the lifting device 20 comprises a guiding pin 21 which co-operates with a cam surface of the control member 19. The lifting device comprises a forked member 22 which embraces the shaft 3 and actuates the sliding movement of brace 4.

The device operates as follows. Starting from the position of the device in which the tone arm 1 occupies a position in which the needle is located in the last grooves of a record to be played, the control member 19 is actuated by a power supply (not shown). As a result, the pin 21 is raised and the forked member 22 of device 20 raises brace 4. Elevating pin 5 also moves and consequently lifts and rotates the pick-up arm 1 about the shaft 2 in an upward direction. During this movement the extension 11 will engage the bottom of stud 9. Since extension 11 is in the form of a leafspring the upward movement of the brace 4 is not prevented. This upward movement causes the plate 14 to be also raised against the action of a spring 23. As a result the plate 14 is urged against the brace 4 so that a slip clutch is connected between plate 14 and brace 4. Because of the upward movement of plate 14, follower 15 becomes located in groove 25 of control member 19. On further movement of the control member 19 the follower 15 is moved counterclockwise (Fig. 2) and because of the friction clutch and the fact that the projection 16 engages brace 4, this brace and consequently the shaft 3 and the tone arm 1 follow the movement. As a result, tone arm 1 is moved to a position outside the periphery of the records. After a new record has been arranged on the turn-table, in a manner not shown, control member 19 drives the follower 15 clockwise in Figure 2. The clutch drives brace 4 and tone arm 1 moves until extension 11 of brace 4 strikes stud 9 or one of its stops 12 and 13 strikes the stop 10 depending upon the diameter of the record to be played. This prevents further rotation of brace 4, but the control member 19 will continue to drive the follower 15 in the same direction. As a result, the slip clutch provided between the plate 14 and brace 4 slips, so that the position of plate 14 with respect to brace 4 is changed. Thereupon control member 19 permits lifting device 20 to move down so that tone arm 1 is lowered onto a record. Due to this downward movement the extension 11 is disengaged from stud 9 or stop 10 and the clutch between the brace 4 and the plate 14 is also disconnected. In addition, plate 14 follows at least part of this downward movement so that follower 15 is disengaged from control member 19. Under the action of spring 18 plate 14 assumes a position relative to the brace 4 such that the extension 16 engages this brace 4. The size of the control member 19 in the axial direction can be kept to a minimum. The brace 4 and plate 14 having extension 16 and follower 15, completely follow the movement which is transmitted by the grooves of the records to the tone arm 1, so that the position of the follower 15 with respect to the tone arm 1 is always the same not only at the beginning of the inward movement but also at that of the outward movement of the tone arm 1.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. In an automatic record player, a device for scanning records of various diameters comprising: a turntable, a vertical shaft, a tone arm, means mounting said tone arm on said vertical shaft for movement in a substantially vertical direction and in a substantially horizontal direction toward and away from successive records in playing position on said turntable, an element mounted for slidable movement on said vertical shaft, at least one stop member including a projection mounted in the horizontal path of movement of said element to limit the travel of said tone arm toward the center of said record and to station said tone arm at a predetermined position relative to said record, a cam-shaped, rotatable control mechanism adjacent said element and being provided with a peripheral groove, a plate-shaped member loosely journalled on said vertical shaft and slidable thereon, said plate-shaped member being provided with a follower and having a first projection thereon, said element having a part thereof engaging said plate-shaped member to thereby selectively move said follower into and out of said peripheral groove, said plate-shaped member being rotated in a substantially horizontal plane, resilient means connected at one end to said first projection and at the other end to said element for biasing said plate-shaped member into engagement with said element, a second projection permitting a limit for the travel of said tone arm in the direction away from said turntable, a third projection on said element for engaging said tone arm and moving the same in a substantially vertical plane, and an elevating member operatively connected at one end with the cam surface of said control mechanism and provided at the other end with a part embracing said vertical shaft whereby when said rotatable control mechanism actuates said elevating member said element slides along said vertical shaft to thereby elevate said tone arm while said follower is inserted in said peripheral groove to move said tone arm alternately in directions toward and away from said turntable.

2. In an automatic record player a device for scanning records of various diameters as claimed in claim 1 in which said element and said plate-shaped member are coupled upon engagement with one another to provide a friction clutch, and the friction provided by said clutch exceeds the resiliency of said resilient connection.

3. In an automatic record player a device for scanning records of various diameters as claimed in claim 1 in which said resilient means is a spring, and said first projection and element are engageable by means of said spring with one another during a part of said scanning operation thereby effecting a limit for the outward movement of said tone arm.

4. In an automatic record player a device for scanning records of various diameters as claimed in claim 1 in which said elevating member is actuated by said control member to thereby lift said element and said tone arm, spring means on said vertical shaft for urging said follower away from said control member, the lifting of said element overcoming the force of said spring means to engage said follower with said control member.

References Cited in the file of this patent

UNITED STATES PATENTS

| | | |
|---|---|---|
| 2,397,932 | Erwood et al. | Apr. 9, 1946 |
| 2,584,257 | Cain | Feb. 5, 1952 |